United States Patent
Lee et al.

(10) Patent No.: US 9,147,881 B2
(45) Date of Patent: Sep. 29, 2015

(54) GRAPHENE PAPER WHICH REDUCED GRAPHENE OXIDE LAYERS AND COATING LAYERS ARE STACKED IN SEQUENCE AND PREPARATION METHOD THEREOF

(75) Inventors: Wonoh Lee, Gyeongsangnam-do (KR); Jea Uk Lee, Gyeongsangnam-do (KR); Jin-Woo Yi, Gyeongsangnam-do (KR); Sang-Bok Lee, Gyeongsangnam-do (KR); Jun-Hyung Byun, Busan-si (KR); Byung-Sun Kim, Gyeongsangnam-do (KR)

(73) Assignee: Korea Institute of Machinery and Materials, Daejeon (KR)

( * ) Notice: Subject to any disclaimer, the term of this patent is extended or adjusted under 35 U.S.C. 154(b) by 408 days.

(21) Appl. No.: 13/469,297

(22) Filed: May 11, 2012

(65) Prior Publication Data

US 2013/0065060 A1    Mar. 14, 2013

(30) Foreign Application Priority Data

Sep. 8, 2011    (KR) ........................ 10-2011-0091028

(51) Int. Cl.
| | |
|---|---|
| B32B 9/04 | (2006.01) |
| B28B 1/14 | (2006.01) |
| B82Y 30/00 | (2011.01) |
| B82Y 40/00 | (2011.01) |
| H01M 4/62 | (2006.01) |
| H01M 4/133 | (2010.01) |
| H01M 4/36 | (2006.01) |
| H01M 4/587 | (2010.01) |

(52) U.S. Cl.
CPC .............. *H01M 4/622* (2013.01); *B82Y 30/00* (2013.01); *H01M 4/133* (2013.01); *H01M 4/366* (2013.01); *H01M 4/587* (2013.01); *B32B 9/04* (2013.01); *B82Y 40/00* (2013.01); *Y10T 428/31536* (2015.04)

(58) Field of Classification Search
None
See application file for complete search history.

(56) References Cited

U.S. PATENT DOCUMENTS

| | | | |
|---|---|---|---|
| 2008/0149566 A1* | 6/2008 | Messersmith et al. | 210/702 |
| 2009/0146111 A1* | 6/2009 | Shin et al. | 252/510 |

FOREIGN PATENT DOCUMENTS

| | | |
|---|---|---|
| KR | 1020090059871 A | 6/2009 |
| KR | 10201000093965 A | 8/2010 |
| KR | 10201000136576 A | 12/2010 |

OTHER PUBLICATIONS

Xu et al. (Dopamine-Induced Reduction and Functionalization of Graphene Oxide Nanosheets, Macromolecules, Sep. 27, 2010, vol. 43, pp. 8336-8339.*

(Continued)

*Primary Examiner* — Callie Shosho
*Assistant Examiner* — Patrick English
(74) *Attorney, Agent, or Firm* — Fredrikson & Byron, P.A.

(57) ABSTRACT

The present disclosure relates to a graphene paper which reduced graphene oxide layers and coating layers are stacked in sequence. The graphene paper prepared according to a preparation method of the present invention has excellent electrical conductivity and mechanical properties, and can be economically prepared in large-sized graphene paper, therefore may be efficiently applied to various electrical devices such as thin-film electrodes, flexible electrodes, super capacitors, semiconductor insulating layer reinforcements and TFT semiconductor layer-electrodes, and the like.

12 Claims, 9 Drawing Sheets

(56) References Cited

OTHER PUBLICATIONS

Wang et al., Electrochemical Properties of Graphene Paper Electrodes Used in Lithium Batteries, Chem. Mater., 2009, vol. 21, pp. 2604-2606.*

Kang, Sung Min, "Simultaneous Reduction and Surface Functionalization of Graphene Oxide by Mussel-Inspired Chemistry," Advanced Functional Materials, 2011, vol. 21, pp. 108-112.

Lei, Yanda, "Hydrolysable Tannin as Environmentally Friendly Reducer and Stabilizer for Graphene Oxide," Green Chemistry, 2011, vol. 13, pp. 1655-1658.

Xu, Yuxi, "Flexible Graphene Films via the Filtration of Water-Soluble Noncovalent Functionalized Graphene Sheets," American Chemical Society, 2008, vol. 130, pp. 5856-5857.

* cited by examiner

GRAPHENE PAPER WHICH REDUCED GRAPHENE OXIDE LAYERS AND COATING LAYERS ARE STACKED IN SEQUENCE AND PREPARATION METHOD THEREOF

CROSS-REFERENCES TO RELATED APPLICATION

This patent application claims the benefit of priority from Korean Patent Application No. 10-2011-0091028, filed on Sep. 9, 2011, the contents of which are incorporated herein by reference.

BACKGROUND OF THE INVENTION

1. Field of the Invention

The present disclosure relates to a graphene paper which graphene oxide layers and coating layers are stacked in sequence and a preparation method thereof.

2. Description of the Related Art

Generally, graphite is a stack of two-dimensional graphene sheets formed from a planar array of carbon atoms bonded into hexagonal structures. Recently, when single or multiple graphene layers were removed to analyze the properties and found useful properties of graphene sheets that were different from existing material.

The most noticeable of these properties is that electrons flow as zero mass in the graphene sheets. As a result, the electrons flow at the velocity of light in a vacuum, which means flowing in the speed of light. In addition, an anomalous half-integer quantum hall effect for both electron and electron holes are observed in graphene sheets.

Currently, the electron mobility of graphene sheet is as high as about 20,000 to 50,000 $cm^2/Vs$. Also, it is preferable to manufacture products using graphene sheets rather than carbon nanotubes, since products made from graphite are inexpensive while products made from carbon nanotubes which are used in applications similar to those in which graphene sheets are used, are expensive due to low yields during synthesis and purification processes even though the carbon nanotubes themselves are inexpensive. Single wall carbon nanotubes exhibit different metallic and semiconducting characteristics according to their chirality and diameter. Furthermore, single wall carbon nanotubes having identical semiconducting characteristics have different energy band gaps depending on their chirality and diameter. Thus, in order to obtain a metallic single wall carbon nanotube composition or a semiconducting single wall carbon nanotube composition, it is desirable to separate the single wall carbon nanotubes from each other in order to obtain desired metallic or semiconducting characteristics respectively. However, separating single wall carbon nanotubes is not a simple or inexpensive process.

On the other hand, it is advantageous to use graphene sheets since it is possible to design a device to exhibit desired electrical characteristics by arranging the graphene sheets so that their crystalline orientation is in a desired direction since their electrical vary with crystalline orientation. It is envisioned that these characteristics of graphene sheets will render them useful in carbonaceous electrical devices or carbonaceous electromagnetic devices in the future.

However, although graphene sheets have these advantageous characteristics, a process of economically and reproducibly preparing a large-sized graphene sheet has not yet been developed.

Three methods that are currently available for preparing graphene are micromechanical method, SiC crystal thermal decomposition method and chemical vapor deposition method (CVD).

According to the micromechanical method, a graphene sheet separated from graphite can be deposited on the surface of Scotch™ tape by attaching the tape to a graphite sample and detaching the tape. In this case, the separated graphene sheet does not include a uniform number of layers, and the graphene sheets have an irregular shape similar as a ripped paper. Furthermore, a large-sized graphene sheet cannot be prepared using the micromechanical method.

In SiC crystal thermal decomposition method, a single crystal SiC is heated to remove Si by decomposition of the SiC on the surface thereof, and then residual carbon C forms a graphene sheet. However, single crystal SiC which is used as the starting material is very expensive, and a large-sized graphene sheet cannot be easily prepared.

In addition, in chemical vapor deposition method, transition metals such as nickel (Ni) or copper (Cu) are used as the catalyst layer which can adsorb carbon at high temperatures. When reacted with methane and hydrogen gas mixture, the carbon atom adsorb to the catalyst layer. These carbon atoms contained in the catalyst layer are crystallized on the surface when cooled, therefore generating graphene.

However, chemical vapor deposition method is advantageous for obtaining large-sized graphene with identical crystalline forms, but graphene can not exist in independent form since they are always transcribed on the substrate surface.

Meanwhile, an attempt has been made to prepare graphene using a chemical process. However, the process is not completely controllable. Another method of preparing graphene was by forming and dispersing graphene oxide. Since graphene oxide is easily dispersed, a thin layer made of the graphene oxide can be easily formed. Other attempts are being made to manufacture graphene by reducing the graphene oxides.

Patent Document 1 [Korean Patent Application No. 10-2007-0126947] discloses a method of preparing a reduced graphene oxide thin layer comprising the steps of: forming a graphene oxide layer by coating a graphene oxide dispersion on a substrate; reducing the graphene oxide by immersing the substrate comprising the graphene oxide layer in a reducing agent-containing solution; and doping an organic dopant and/or inorganic dopant on the reduced graphene oxide.

Patent Document 2 [Korean Patent Application No. 10-2009-0013137] discloses a graphene sheet including intercalation compound and a preparation method thereof, to control the electrical, optical, and physical properties of the graphene sheet according to the intercalated compounds without deteriorating the intrinsic electrical properties, transmittance, and flexibility of the graphene sheet.

Patent Document 3 [Korean Patent Application No. 10-2009-0054708] discloses a method of manufacturing a large-sized graphene film through the process of spin drying and reducing a graphene film dispersed in a hydrophilic solution, comprising the steps of: manufacturing a dispersion solution by dispersing graphene oxide in a hydrophilic solution; spin drying the dispersion solution; and reducing the graphene oxide film obtained by spin drying.

However, none of the above disclosed methods could perfectly reproduce the mechanical properties and electrical properties of the graphene.

Thus, the present inventors have performed intensive research to develop a graphene paper with excellent electrical conductivity and mechanical properties. As a result, the present inventors identified that graphene paper which the reduced graphene oxide layers and coating layers are stacked in sequence prepared according to the method of the present invention has excellent electrical conductivity and mechanical properties, thereby leading to completion of the present invention.

SUMMARY OF THE INVENTION

One object of the present invention is to provide a graphene paper which reduced graphene oxide layers and coating layers are stacked in sequence.

Another object of the present invention is to provide a preparation method of the graphene paper.

Still another object of the present invention is to provide a thin-film electrode comprising the graphene paper.

Even another object of the present invention is to provide a flexible electrode comprising the graphene paper.

In order to achieve the objects, the present invention provides a graphene paper comprising:

a reduced graphene oxide layer (a first layer); and a coating layer (a second layer) formed by coating the reduced graphene oxide layer with a polymer of a compound represented by the following Formula 1, wherein the first and second layers are repeatedly stacked in sequence, and the compound represented by the following Formula 1 forms the first and second layers by reducing graphene oxide:

[Formula 1]

where $R^1$ is —H, —OH or $C_{1-3}$ alcohol,
$R^2$ is —OH, —NH$_2$ or —NHCH$_3$, and
$R^3$ is —H or —OH.

The present invention also provides a preparation method of g the graphene paper comprising the steps of:

preparing a mixture by mixing a compound represented by Formula 1, graphene oxide, and a buffer solution (Step 1);

obtaining a wet state graphene paper by filtering the mixture prepared in Step 1 using a mold that selectively pass the solvent through the lower part (Step 2); and drying the wet state graphene paper obtained in Step 2 (Step 3).

Furthermore, the present invention provides a thin-film electrode comprising the graphene paper.

The present invention also provides a flexible electrode comprising the graphene paper.

The graphene paper of the present invention, which graphene oxide layers and coating layers are stacked in sequence, has excellent electrical conductivity and mechanical properties, and can be economically prepared in large-sized graphene paper, therefore may be efficiently applied to various electrical devices such as thin-film electrodes, flexible electrodes, super capacitors, semiconductor insulating layer reinforcements and TFT semiconductor layer-electrodes, and the like.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Features and advantages of the present invention will be more clearly understood by the following detailed description of the present preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

Hereinafter, the present invention will be described in detail.

Figure 1:
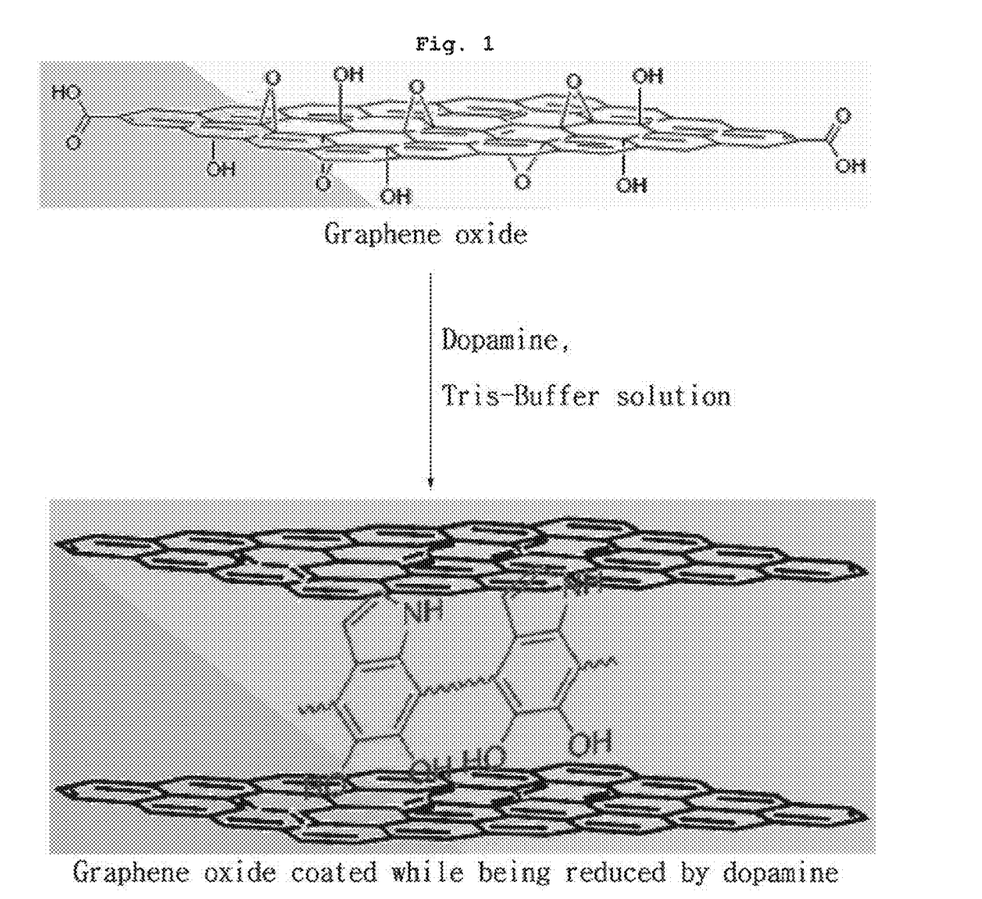
FIG. 1 is a simplified illustration depicting the graphene paper prepared according to one Example of the present invention.

Disclosed herein is preparation of reduced graphene oxide paper by treating the graphene oxide with the compound represented by Chemical Figure 1 for simultaneous reduction and coating. The prepared graphene paper shows improved electrical conductivity and mechanical properties, which can be effectively used as variety of display devices or flexible electrode, and may be applied to TFT semiconductor layers.

The term "graphene oxide" used herein refers to an oxide prepared by oxidizing graphite. The graphene oxide is distinguished from graphite since graphene oxide can be dispersed in a solution, and thus can be formed as a thin layer. Accordingly, a thin layer of the graphene oxide is formed using the graphene oxide dispersion and the thin layer is reduced to form a graphene in the form of a sheet. The term "reduced graphene oxide" used herein indicates a compound prepared by reducing the graphene oxide.

The "graphene" used herein indicates polycyclic aromatic molecules in which a plurality of carbon atoms are covalently bound to each other. The covalently bound carbon atoms form repeating units that comprise 6-membered rings, but can also form 5-membered rings and/or 7-membered rings. Accordingly, in the graphene it appears as if the covalently bound carbon atoms (usually, sp$^2$ bond) form a single layer. The graphene sheet may have various structures and the structure may vary according to the amount of the 5-membered rings and/or the 7-membered rings. The graphene may not only comprise a single layer, but may also comprise a plurality of layers of graphene up to a thickness of 100 nm. Generally, the side ends of the graphene are saturated with hydrogen atoms.

The reduced graphene oxide can have similar shapes and physical properties when compared with graphene. The electrical conductivity is reduced when compared with graphene.

In order to compensate for the poor electrical properties of the reduced graphene oxide, the graphene oxide was reduced and coated simultaneously with the compound represented by Chemical Figure 1, and therefore compensated for the electrical characteristics and improved the mechanical properties.

Hereinafter, the present invention will be described in detail.

The present invention provides a graphene paper comprising:

a reduced graphene oxide layer (a first layer); and a coating layer (a second layer) formed by coating the reduced graphene oxide layer with a polymer of a compound represented by the following Formula 1, wherein the first and second layers are repeatedly stacked in sequence, and the compound represented by the following Formula 1 forms the first and second layers by reducing graphene oxide.

[Formula 1]

where $R^1$ is —H, —OH or $C_{1-3}$ alcohol,
$R^2$ is —OH, —NH$_2$ or —NHCH$_3$, and
$R^3$ is —H or —OH.
Preferably, $R^1$ is —H or —OH
$R^2$ is —OH or —NHCH$_3$, and
$R^3$ is —H or —OH.

More preferably, the compound represented by Formula 1 is dopamine, norepinephrine or epinephrine.

Still more preferably, the compound represented by Formula 1 is dopamine.

According to the graphene paper of the present invention, the polymer in the second layer reduces the graphene oxide and coats between the graphene layers at the same time, therefore functions to bind each graphene layer like paper forms. As a result, the electrical conductivity and mechanical properties of the graphene paper is improved.

Accordingly, the polymer is made from monomers represented by the following Formula 2.

[Formula 2]

where $R^1$, $R^2$ and $R^3$ are the same as in Formula 1,
⌇⌇⌇ is $C_{1-10}$ linear or branched alkyl, and
n is an integer, which depends on the size of the graphene paper.

Preferably, the polymer made from monomers represented by Formula 2 is polydopamine, polynorepinephrine or polyepinephrine.

More preferably, the polymer made from monomers represented by Formula 2 is polydopamine.

The graphene paper of the present invention has a property of flexibility. Therefore, graphene paper may be manufactured in any thickness. Preferably, the thickness of the graphene paper is in the range of 1 to 10,000 μm, when applied to electronic materials.

The present invention also provides a method of preparing the graphene paper comprising the steps of:

preparing a mixture by mixing the compound represented by Formula 1, graphene oxide and a buffer solution (Step 1);

obtaining a wet state graphene paper by filtering the mixture prepared in Step 1 using a mold that selectively pass a solvent through a lower part thereof (Step 2); and drying the wet state graphene paper obtained in Step 2 (Step 3).

[Formula 1]

where $R^1$, $R^2$ and $R^3$ are the same as those described previously.

Hereinafter, the present invention will be described in more detail with FIG. 1.

In the method of preparing the graphene paper according to the present invention, Step 1 is a step of mixing graphene oxide, the compound of the Formula 1, and the buffer solution.

In detail, when a weak base environment of pH 7-10 is generated in the buffer solution, oxidation polymerization occurs with the removal of hydrogen atoms from the compound of Formula 1. During this process, the large surface area of graphene oxide is coated and reduced, producing a graphene paper which has a structure of (reduced graphene paper)-(polymer of the compound of Formula 1)-(reduced graphene paper) stacked in sequence (see FIG. 1).

For the buffer solution, Tris-buffered saline solution may be used, and preferably the buffer solution may be in the range of pH 7-10.

If the pH of the buffer solutions is lower than pH 7, the solution is acidic and no hydrogen atoms will be removed from Formula 1, however if the pH is higher than pH 10, the rate and degree of polymerization may be too high, leading to the problem of self polymerization instead of coating the graphene paper.

The graphene oxide can be synthesized by methods of Hummers (Hummers w. Offeman r. Preparation of graphite oxide. J Am Chem Soc 1958, 80, 1339), Staudenmaier (Staudenmaier L. Verfahren zurdarstellung der graphitsaure, Ber Dtsch Chem Ges 1898, 31, 1481-99), BrodieBC (BrodieBC. Sur le poids atomique graphite. Ann Chim Phys 1860, 59, 466-72), and the like.

According to the preparation method of the graphene paper of the present invention, Step 2 is a step of obtaining a wet state graphene paper by putting and filtering the mixture prepared in Step 1 in a mold.

In detail, a wet state graphene paper is obtained in a mold by putting the solution containing the graphene paper prepared in Step 1 in a mold that can selectively pass through the solvent to the lower part and removing the solvent by filtration.

Accordingly, a mold of any shape or size may be used as long as the mold can selectively remove only the solvent through the bottom.

In the preparation method of the graphene paper according to the present invention, Step 3 is a step of drying the wet state graphene paper obtained in Step 2.

The wet state graphene paper may be dried by methods of natural drying at room temperature for over 48 hours and evaporating the moisture under low pressure using a vacuum oven.

Further, the present invention provides a thin-film electrode comprising the graphene paper.

The present invention also provides a flexible electrode comprising the graphene paper.

The graphene paper of the present invention, which graphene oxide layers and coating layers are stacked in sequence, has excellent electrical conductivity and mechanical properties, and can be economically prepared in large-sized graphene paper, therefore may be efficiently applied to various electrical devices such as thin-film electrodes, flexible electrodes, super capacitors, semiconductor insulating layer reinforcements and TFT semiconductor layer-electrodes, and the like.

EXAMPLES

Hereinafter, the present invention will be described in more detail with reference to the following examples and experimental examples. However, the following examples and experimental examples are provided for illustrative purposes only, and the scope of the present invention should not be limited thereto in any manner.

Preparation Example 1

Preparation of Graphene Oxide

Twelve grams of pure graphite (Manufacturer: Sigma Aldrich), 50 ml of Sulfuric acid, 10 g of potassium persulfate, 10 g of phosphorous pentoxide and 1 L of distilled water were added in a round bottom flask, and then mixed for 12 hours.

Pretreated graphite was obtained by filtering the mixture solution from above, and then graphite oxide was obtained by mixing 4 g of the pretreated graphite with 58 g of phosphorous pentoxide, 24 g of potassium permanganate and 80 ml of distilled water.

Next, Mn was removed by adding 200 ml of HCl and 200 ml of distilled water and then mixing for 3 hours, followed by washing with centrifugation. This process was repeated for two times.

Finally, graphene oxide (3.8 g) was obtained by neutralizing with a solution containing 3:2 ratios of methanol and ether.

Example 1

Preparing Graphene Oxide Paper (pDop/rGo Paper) Containing Dopamine Coating Layer A wet state graphene oxide paper reduced with dopamine was prepared by stirring 10 mg of graphene oxide obtained in Preparation Example 1, 0.5 mg of dopamine and Tris-buffer solution (pH 8.5, 10 ml), and then putting in a round mold (diameter 47 mm) that can selectively passes only the solvent through the lower part.

And then, dopamine reduced graphene oxide paper, with a diameter of 47 mm and a thickness of 3.2 μm, was prepared by drying at room temperature for 2 days.

Figure 2:
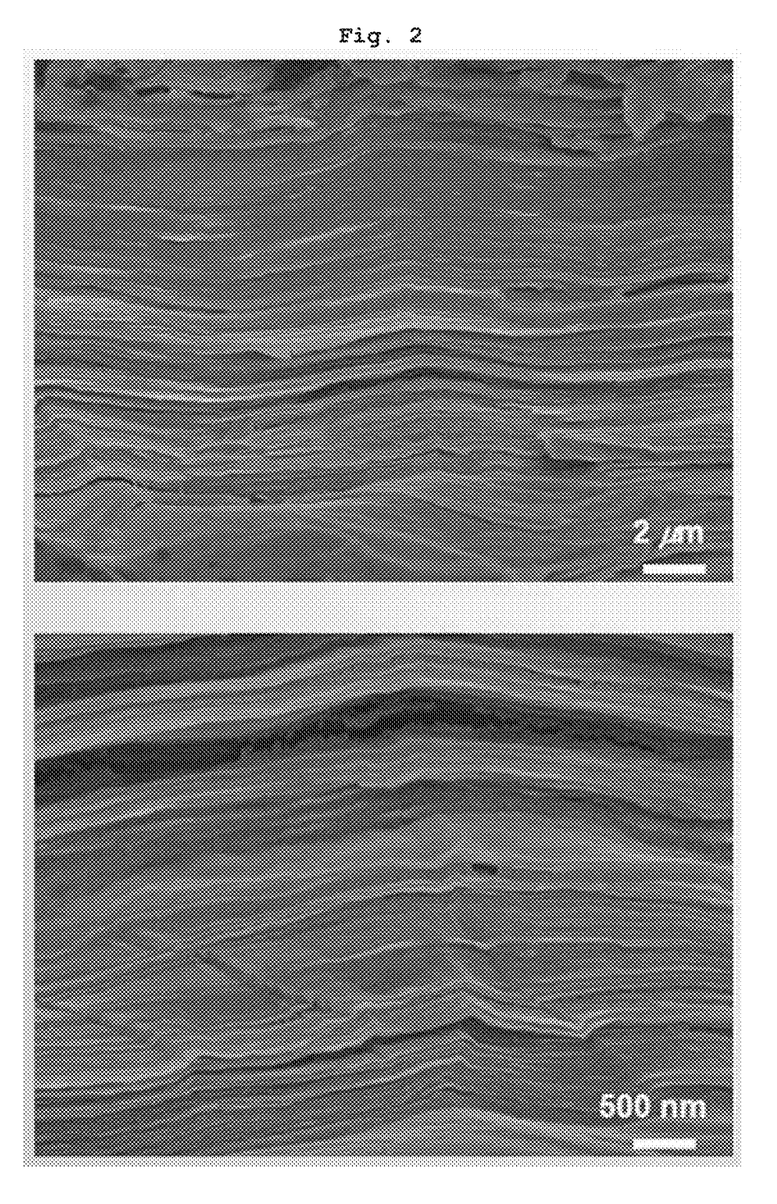
FIG. 2 is a side-view SEM image of a graphene paper prepared at a thickness of 21.2 μm to show the graphene oxide reduced with dopamine more effectively.
Figure 3:
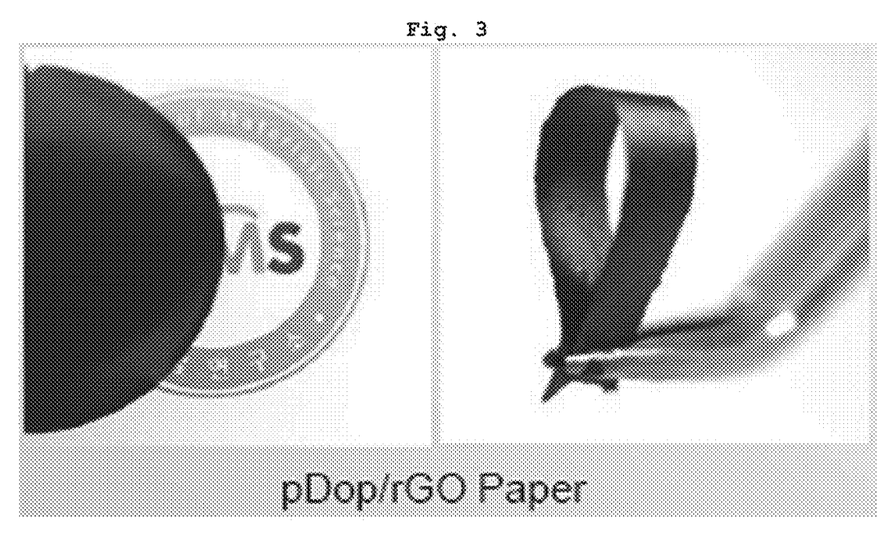
FIG. 3 is an image of the graphene paper prepared according to one Example of the present invention.

FIG. 1 is a simplified illustration depicting the graphene paper prepared according to one Example of the present invention, FIG. 2 is a side-view SEM image of a graphene paper prepared thicker (thickness of 21.2 μm) to show the graphene oxide reduced with dopamine more effectively, and FIG. 3 is an image of the graphene paper prepared according to one Example of the present invention.

Comparative Example 1

Preparation of Graphene Oxide Paper (GO Paper)

A wet state graphene oxide paper was prepared by stirring 10 mg of graphene oxide obtained in Preparation Example 1, and 10 ml of distilled water for 2 hours and then putting in a mold (diameter 47 mm) similar to those used in Example 1 and passing the solvent through the lower part.

And then, graphene oxide paper with a diameter of 47 mm and a thickness of 3.2 μm was prepared after drying at room temperature for 2 days.

Figure 4:
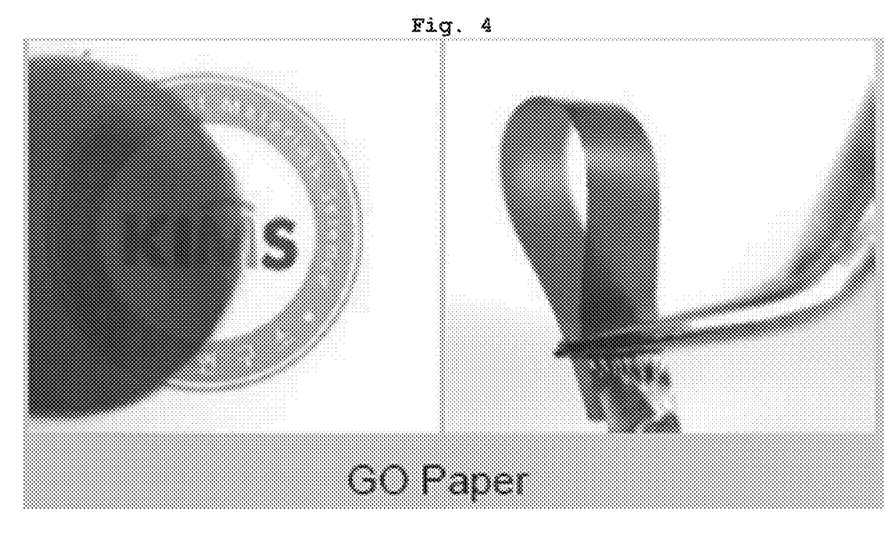
FIG. 4 is an image of the graphene paper prepared in one Comparative Example of the present invention.

FIG. 4 is the graphene oxide paper prepared in the Comparative Example.

Experimental Example 1

IR Spectroscopy Analysis

IR spectroscopy analysis was performed to investigate whether dopamine reduces and coats graphene oxide.

In detail, dopamine reduced graphene oxide paper prepared in Example 1, and graphene oxide paper prepared in Comparative Example 1 were each measured with IR spectroscopy, and confirmed that dopamine reduced the graphene oxide. The result is shown in FIG. 5.

Figure 5:
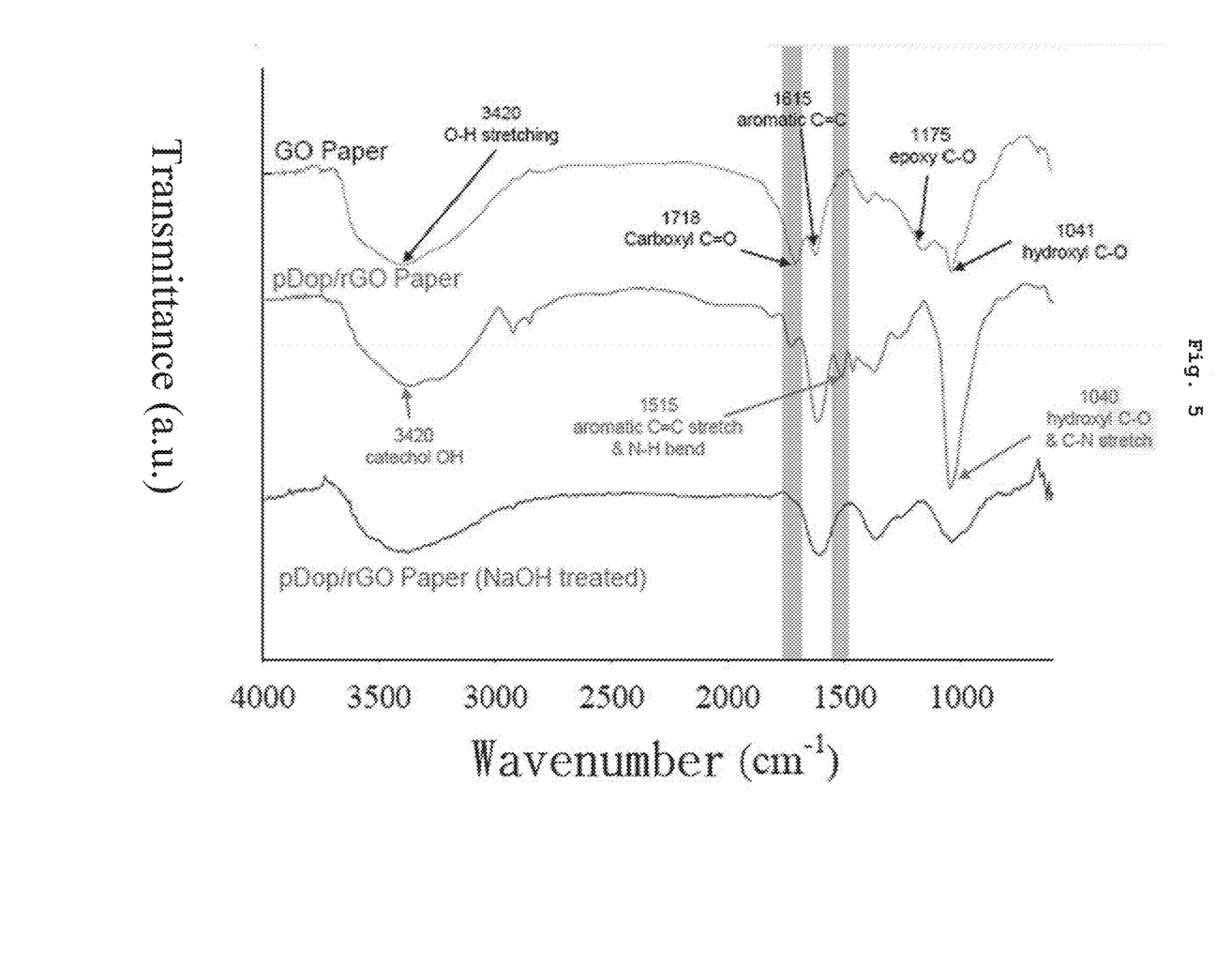
FIG. 5 is a graph representing the IR spectroscopy result of the graphene paper according to one Example of the present invention.

FIG. 5 is a graph representing the IR spectroscopy of the graphene paper according to one Example of the present invention.

In FIG. 5, "pDop/rGO Paper(NaOH treated)" is the IR spectroscopy peak measured after removing polydopamine with NaOH, in order to analyze the graphene oxide paper (rGO paper) reduced exclusively by polydopamine (pDop).

As shown in FIG. 5, when compared with graphene oxide paper (rGO paper) prepared in Comparative Example 1, the graphene oxide paper containing dopamine coating layer prepared in Example 1 (pDop/rGO paper), showed reduction in the C=O carboxyl peak at wavenumber 1718 $cm^{-1}$, stronger aromatic C=C peak at wavenumber 1615 $cm^{-1}$ and disappearance of N—H peak at wavenumber 1515 $cm^{-1}$.

Therefore, the graphene paper prepared in Example 1 indicated that dopamine successfully reduced and coated the graphene oxide.

Experimental Example 2

Analysis of Electrical Conductivity

The following experiments were performed to analyze the electrical conductivity of graphene paper prepared in Example 1 and Comparative Example 1.

In detail, the graphene papers prepared in Example 1 and Comparative Example 1 were heated at room temperature, 100, 150 and 200° C. for 3 hours, and then the sheet resistance was measured by using 4 point-probe sheet resistance system (manufacturer: Napson, Model name: Cresbox). The result is shown in FIG. 6.

Figure 6:
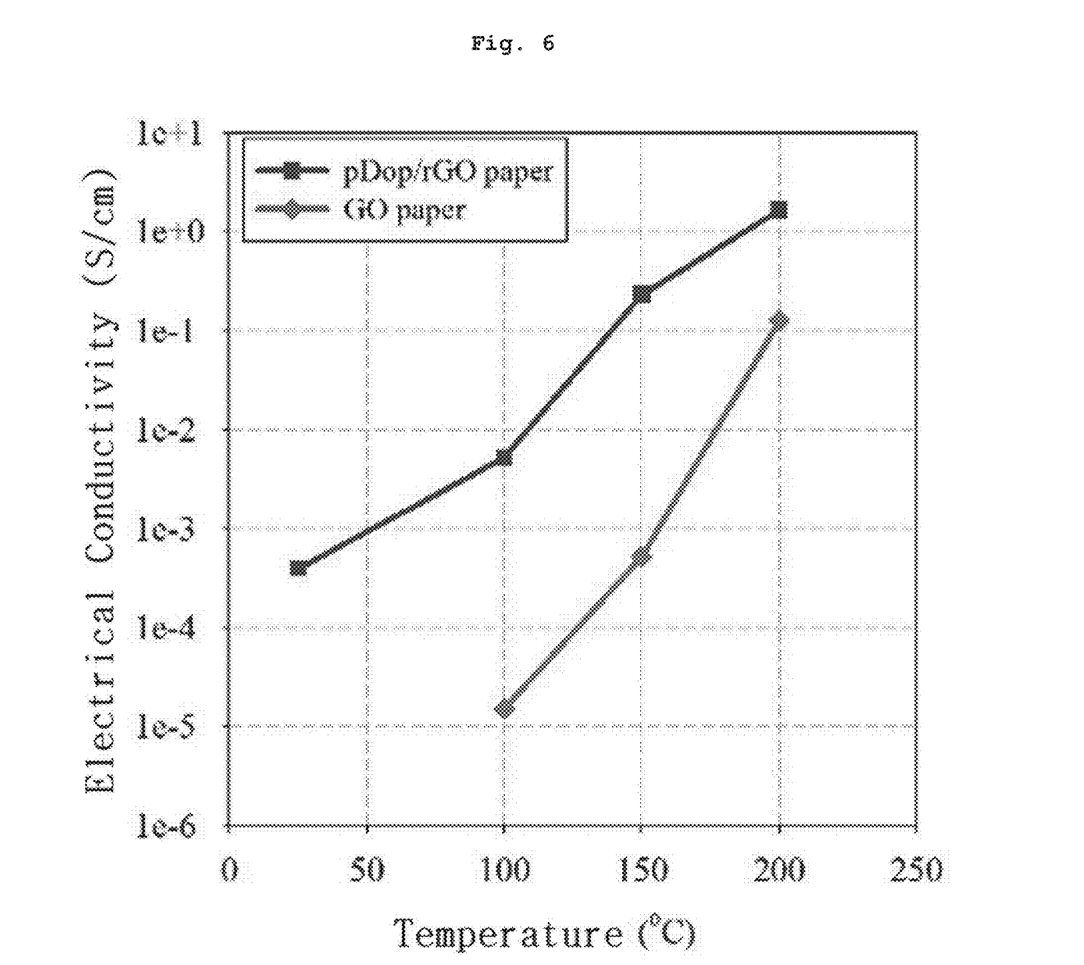
FIG. 6 is a graph showing the electrical conductivity of the graphene paper according to one Example of the present invention.

FIG. 6 is a graph showing the result of electrical conductivity of the graphene paper according to one Example of the present invention.

As shown in FIG. 6, the reduced graphene oxide paper containing the dopamine coating layer prepared in Example 1 (pDop/rGO paper) showed electrical conductivity at room temperature. However, graphene oxide paper (GO paper) prepared in Comparative Example 1 did not show any electrical conductivity at room temperature. These results indicate that successful reduction has occurred by dopamine.

In addition, when the electrical conductivity of the pDop/rGO paper prepared in Example 1 was compared with GO paper prepared in Comparative Example 1 at each heat treated conditions, the pDop/rGO paper showed 350-fold increase at 100° C., 450-fold increase at 150° C. and 12-fold increase at 200° C.

Thus, the pDop/rGO paper according to the present invention has excellent electrical conductivity, therefore may be efficiently applied to various electrical devices such as, thin-film electrodes, flexible electrodes, super capacitors, semiconductor insulating membrane reinforcements and TFT semiconductor layer-electrodes.

Example 3

Analysis of Mechanical Properties

The following experiments were performed to analyze the mechanical properties of graphene papers prepared in Example 1 and Comparative Example 1.

In detail, the graphene paper in Example 1 (pDop/rGO Paper) was prepared into a test sample with a width of 3 mm, a gauge length of 15 mm, and a thickness of 3.2 μm, while the graphene paper in Comparative Example 1 was prepared into a test sample with a width of 3 mm, a gauge length of 15 mm, and a thickness of 3.0 μm.

Next, elongation, strength and modulus of the test samples were measured using 50N load cell tensile tester (manufacturer: Instron, model name: Instro-5543) at a loading rate of 10 μm/min.

Figure 7:
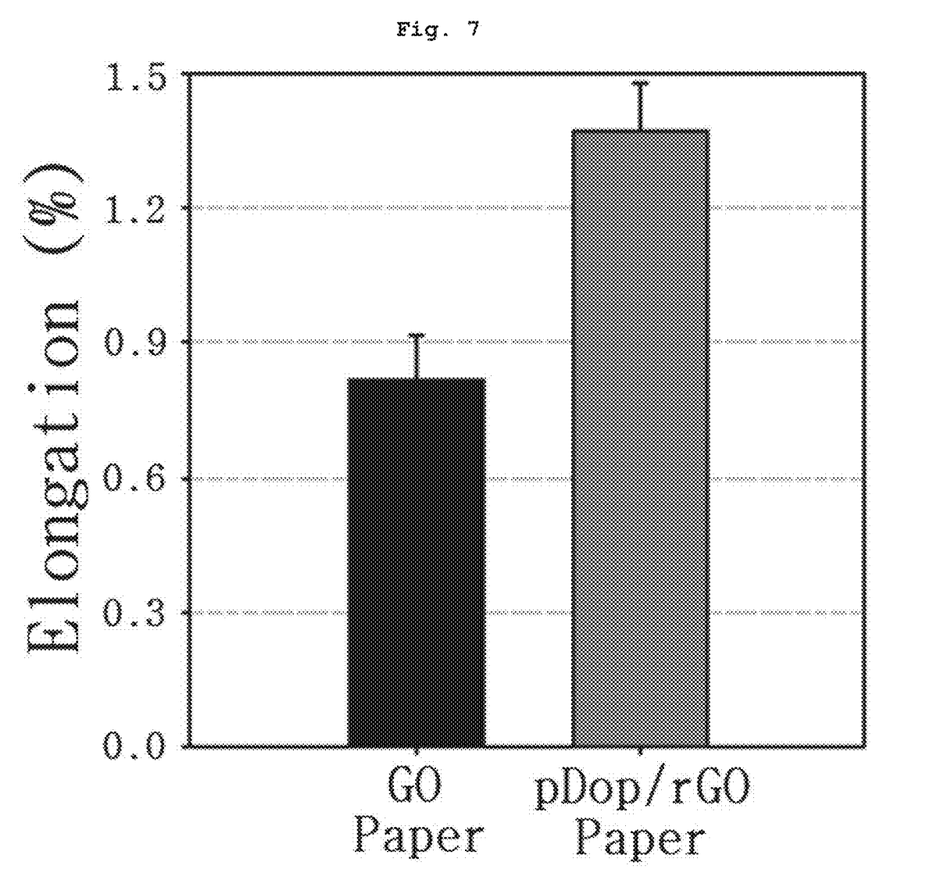
FIG. 7 is a graph showing the results of elongation measurement for graphene paper according to one Example of the present invention.
Figure 8:
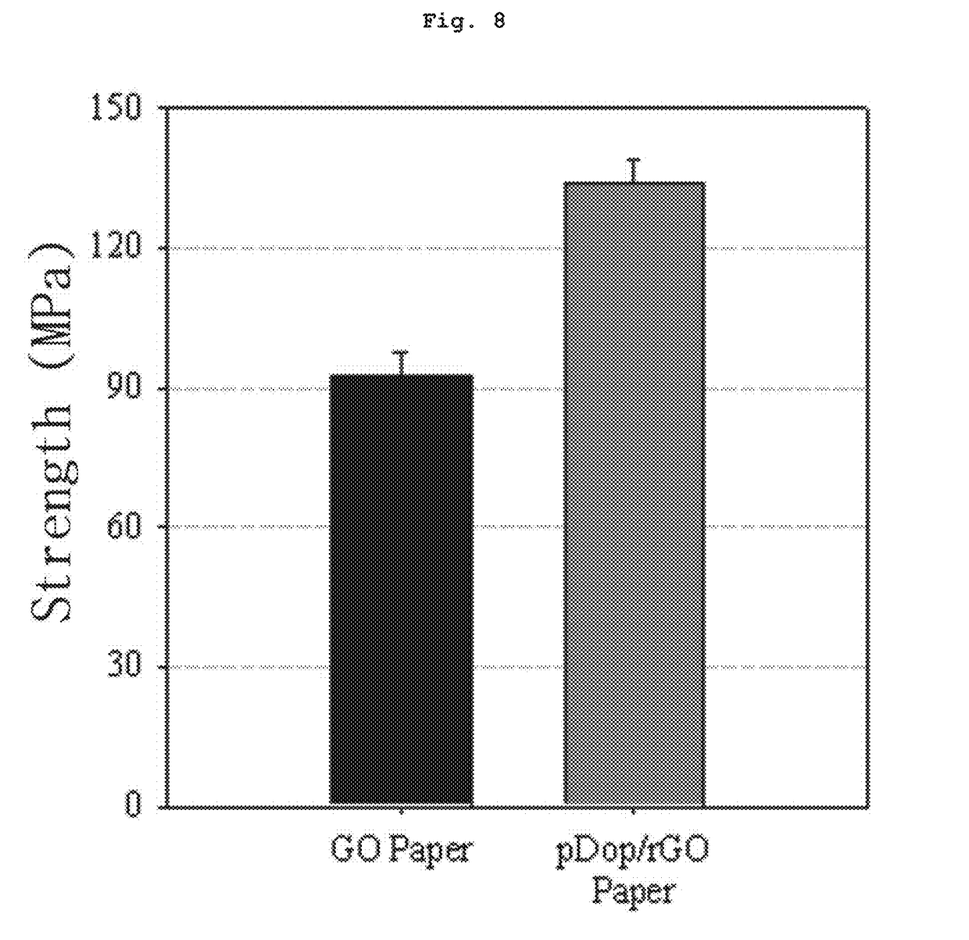
FIG. 8 is a graph showing the results of strength measurements for graphene paper according to one Example of the present invention.
Figure 9:
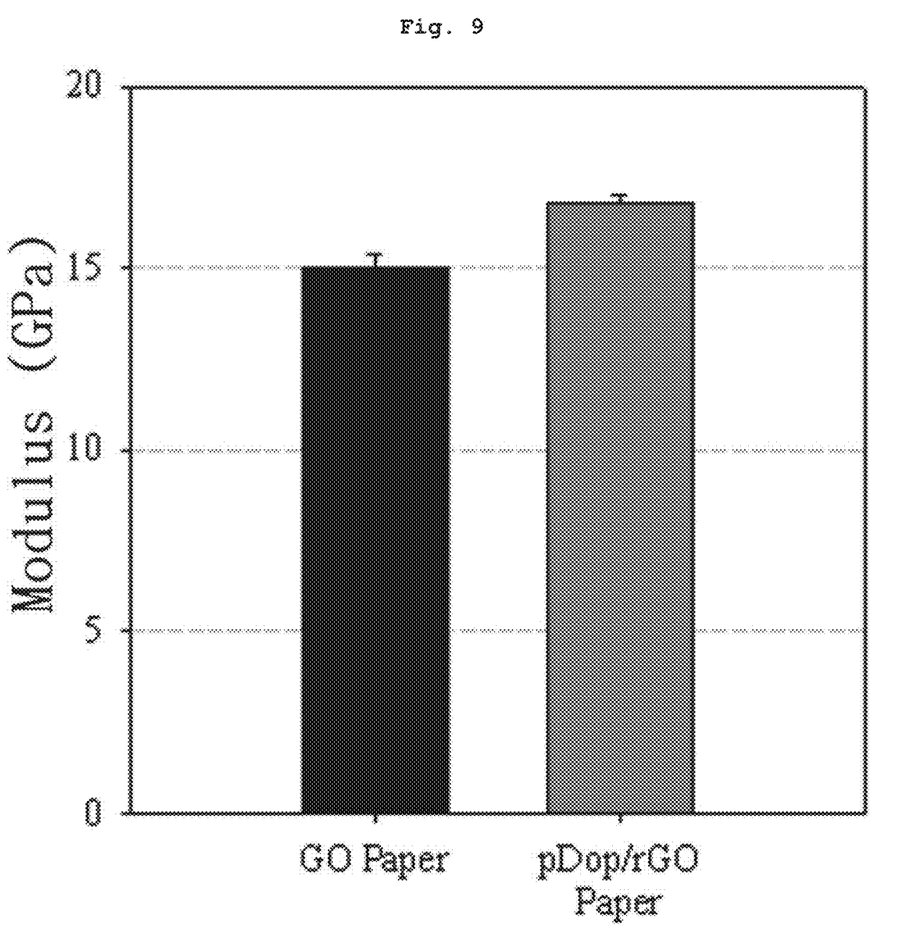
FIG. 9 is a graph showing the results of modules measurement for graphene paper according to one Example of the present invention.

The results of elongation measurements are shown in FIG. 7, the results of strength measurements are shown in FIG. 8, and the results of modules measurement are shown in FIG. 9.

FIG. 7 is a graph showing the result of elongation measurements for graphene paper according to one Example of the present invention.

FIG. 8 is a graph showing the result on strength measurement of the graphene paper according to one Example of the present invention.

FIG. 9 is a graph showing the result on modules measurement of the graphene paper according to one Example of the present invention.

As shown in FIG. 7, the elongation rate of the graphene paper prepared in Example 1 was about 1.4%, and the elongation rate of the graphene paper prepared in Comparative Example 1 was 0.8%, which indicates that there was about 70% increase in the elongation rate of the graphene paper of the present invention.

As shown in FIG. 8, the strength of the graphene paper prepared in Example 1 was 134 MPa, and the strength of the graphene paper prepared in Comparative Example 1 was 63 MPa. This result shows that the strength of the graphene paper was increased by about 45%.

As shown in FIG. 9, the modules of the graphene paper prepared in Example 1 were 17 GPa, and the modules of the graphene paper prepared in Comparative Example 1 were 15 GPa. The result shows that there was about 12% increase in the modules of the graphene paper of the present invention.

Since the graphene paper according to the present invention has excellent elongation, strength and modulus, therefore may be efficiently applied to various electrical devices such as, thin-film electrodes, flexible electrodes, super capacitors, semiconductor insulating membrane reinforcements and TFT semiconductor layer-electrodes.

What is claimed is:

1. A graphene paper comprising:
a reduced graphene oxide layer (a first layer); and
a coating layer (a second layer) formed by coating the reduced graphene oxide layer with a polymer of a compound represented by the following Formula 1,
wherein the first and second layers are repeatedly stacked in sequence, wherein each second layer binds each adjacent first layer, and use of the compound represented by the following Formula 1 results in the formation of the first and second layers by reducing graphene oxide,

[Formula 1]

where $R^1$ is —H, —OH or $C_{1-3}$ alcohol,
$R^2$ is —OH, —NH$_2$ or —NHCH$_3$, and
$R^3$ is —H or —OH.

2. The graphene paper as set forth in claim 1, wherein
$R^1$ is —H, or —OH,
$R^2$ is —OH or —NHCH$_3$, and
$R^3$ is —H or —OH.

3. The graphene paper as set forth in claim 1, wherein the compound represented by the Formula 1 is dopamine, norepinephrine or epinephrine.

4. The graphene paper as set forth in claim 1, wherein the polymer of the second layer is made from monomers represented by the following Formula 2:

[Formula 2]

where
⌇⌇⌇ is $C_{1-10}$ linear or branched alkyl, and
n is an integer, which depends on the size of the graphene paper.

5. The graphene paper as set forth in claim 4, wherein the polymer made from the monomers represented by the Formula 2 is polydopamine, polynorepinephrine or polyepinephrine.

6. The graphene paper as set forth in claim 1, wherein the graphene paper is flexible.

7. A thin-film electrode comprising the graphene paper of claim 1.

8. A flexible electrode comprising the graphene paper of claim 1.

9. The graphene paper as set forth in claim 1, wherein the first and second layers are directly adjacent.

10. The graphene paper as set forth in claim 1, wherein elongation is increased about 70%, strength is increased about 45%, and modulus is increased about 12% relative to a graphene oxide paper having a first layer and having no second layer.

11. A preparation method of the graphene paper of claim 1, which comprises the steps of:
preparing a mixture by mixing a compound represented by the following Formula 1, graphene oxide, and a buffer solution (Step 1);
obtaining a wet state graphene paper by filtering the mixture prepared in Step 1 using a mold that selectively pass a solvent through a lower part thereof (Step 2); and
drying the wet state graphene paper obtained in Step 2 (Step 3)

[Formula 1]

12. The preparation method as set forth in claim 11, wherein the buffer solution in Step 1 is in the range of pH 7 to 10.

* * * * *